US005439653A

United States Patent [19]

Avila, Sr.

[11] Patent Number: 5,439,653

[45] Date of Patent: Aug. 8, 1995

[54] APPARATUS FOR LIQUIFYING SUBSTANCES

[76] Inventor: Abel A. Avila, Sr., 16565 Jackson Ave., Lemoore, Calif. 93245

[21] Appl. No.: 54,299

[22] Filed: Apr. 30, 1993

[51] Int. Cl.[6] .......... B01D 12/00

[52] U.S. Cl. .......... 422/261; 222/227; 222/231; 222/236; 422/268

[58] Field of Search .......... 222/227, 231, 236; 239/662, 663; 198/550.12; 366/49, 64, 118, 119, 186, 192; 156/39, 346; 106/772; 422/261, 268

[56] References Cited

U.S. PATENT DOCUMENTS

| | | | |
|---|---|---|---|
| 353,436 | 11/1886 | Andrus | 222/310 |
| 757,426 | 4/1904 | Noey et al. | 137/268 |
| 857,563 | 6/1907 | Leopold et al. | 422/268 |
| 1,862,238 | 6/1932 | Roe et al. | 47/1.01 |
| 2,992,724 | 7/1961 | Berger | 198/550.12 |
| 3,123,256 | 3/1964 | Smith et al. | 222/227 |
| 3,158,294 | 11/1964 | Handlee | 222/227 |
| 3,212,672 | 10/1965 | Kromhout et al. | 222/227 |
| 3,404,963 | 10/1968 | Fritsche et al. | 422/261 |
| 3,414,163 | 12/1968 | Gaddis | 222/57 |
| 3,610,474 | 10/1971 | Usher et al. | 222/371 |
| 3,722,747 | 3/1973 | Petit | 222/227 |
| 3,920,552 | 11/1975 | Elkern | 210/141 |
| 4,044,921 | 8/1977 | Caverly | 222/227 |
| 4,056,202 | 11/1977 | Mackenzie et al. | 198/550.12 |
| 4,759,632 | 7/1988 | Horiuchi et al. | 366/118 |
| 4,850,515 | 7/1989 | Cleland | 222/227 |
| 4,942,003 | 7/1990 | Bold | 156/39 |
| 4,965,031 | 10/1990 | Conroy | 156/39 |
| 5,008,055 | 4/1991 | Holley | 106/772 |

*Primary Examiner*—W. Gary Jones
*Assistant Examiner*—Laura E. Edwards
*Attorney, Agent, or Firm*—Worrel & Worrel

[57] ABSTRACT

An apparatus for liquifying a substance embodied in a substantially amorphous mass in a substantially continuous operation, the apparatus having a housing for feeding the substance to a delivery position; a system for supplying liquid to a liquifying station; and an assembly operable to engage the substance in the delivery position and transport the substance toward the liquifying station for receipt in the liquid.

11 Claims, 7 Drawing Sheets

APPARATUS FOR LIQUIFYING SUBSTANCES

BACKGROUND OF THE INVENTION

1. Field of the Invention

The present invention relates to an apparatus for liquifying substances and, more particularly, to such an apparatus which is particularly well suited to the liquification of substances embodied in a substantially amorphous mass in a substantially continuous operation.

2. Description of the Prior Art

A host of substances are manufactured, packaged, sold, and delivered to a work site in a different form than that in which they are ultimately used. This fact results from a number of considerations including that the substances may otherwise lose their efficacy, for ease of transport, to maintain the cost of such substances in a range acceptable in the marketplace and for similar considerations. As a consequence, at the time usage of the substances is to be undertaken, the substances must be converted to a different form at the job site.

For example, gypsum is widely used as a soil treatment in agriculture for the purpose of improving the permeability of the soil. Enhanced permeability permits irrigation water to be employed most effectively and efficiently and enhances the degree to which other soil additives can be successfully employed. For all of the reasons previously mentioned as well as others, gypsum is typically sold in large volumes in powdered form. The large volumes of gypsum are typically housed in bag-type containers which are delivered to the job site. While gypsum can be applied to the soil by a variety of methods, it has been found most effective to dissolve the gypsum in irrigation water which is released to the acreage to be treated through the normal irrigation system thereof. It is known in prior art methods of application to open the containers and deposit the contents into conventional liquifying devices which are employed in dissolving the gypsum in the irrigation water. Such conventional devices characteristically provide a hopper for receiving the gypsum in bulk form and use a delivery mechanism, such as an auger, for dispensing the gypsum to the irrigation water.

Such prior art devices are notoriously inadequate for the purpose. Gypsum is a powdered substance which is, in many respects, very difficult to handle in that, under any substantial pressure, the gypsum compresses to a cake like consistency. In addition, gypsum is highly water soluble. Because of these two properties, gypsum is very difficult to feed continuously since these properties cause the gypsum to "bridge" within the hopper so that it does not feed gravitationally to the distributing mechanism. The propensity for the gypsum to cake and its ability to absorb moisture from the environment, causes it to form a temporarily unitary mass extending between the walls of the hopper and resistant to movement. When the distributing mechanism has passed all of the gypsum from the area beneath the bridge, obviously no further distribution of the gypsum takes place. Since, when applied by irrigation, gypsum is usually applied in very large quantities over very large agricultural acreages, the period of time required to complete the irrigation cycle typically lasts several days. Furthermore, with such large agricultural acreages, the distributing devices are remote from personnel who might monitor the operation of the equipment. Accordingly, a chronic problem inherent in such operations is that such bridging occurs long before it is detected and can be corrected. As a consequence, significant portions of the irrigation cycle are completely devoid of the application of the gypsum thereby entirely defeating the purpose of the operation.

Other problems incident to the conventional application of gypsum and other such substances include mechanical deficiencies which result in the substance not being distributed evenly, the substance being spilled or otherwise lost in the vicinity of the equipment, the irrigation water used in the application of the substance being unintentionally released so as to cause flooding, the uneven application of the substances to the irrigation water and other such entirely unsatisfactory consequences. While these and other unsatisfactory results are particularly acute in the case of the application of gypsum in large scale agricultural irrigation, the same and other problems are inherent in the application of other substances and in other operational environments. For example, the same problems are endemic to the application of such substances as natural and chemical fertilizers, other soil additives and amendments, and, more broadly, all substances which must be converted from one form to another and particularly wherein the first form requires as a matter of practical application that the substance be contained in a substantially amorphous mass of the substance metered over a relatively long period of time in a substantially continuous operation and in which such perimeters as time, concentration, and dependable operation without supervision are critical to the achievement of the operational objectives.

Therefore, it has long been known that it would be desirable to have an apparatus for liquifying substances which has particular utility in the liquification of such substances as must, for other reasons, be dispensed from a large amorphous mass of the substance over a relatively long period of time; which has particular utility in the dispensing of such substances as gypsum and other materials which are embodied in powdered form and wherein the substances may be susceptible to bridging as a result of the absorption of moisture and/or the propensity to adhere in such a fashion as to assume a caked consistency; which automatically operates to ensure that such bridging does not take place entirely without being monitored; which affords the ability for supervisory personnel additionally to ensure that such bridging does not take place; which operates automatically to recover material which has inadvertently been released to the environment and to direct the material for usage in the manner proscribed; which can be operationally adjusted to achieve a volume of distribution over time which is entirely reliable; and which otherwise is entirely effective in achieving its operational objectives.

SUMMARY OF THE INVENTION

Therefore, it is an object of the present invention to provide an improved apparatus for liquifying substances.

Another object is to provide such an apparatus which is particularly well suited to the liquification of substances which must be dispensed over relatively long periods of time from reservoirs thereof of substantial volume.

Another object is to provide such an apparatus which is uniquely well suited to the dispensing of substances which are embodied in powdered form and which otherwise may be susceptible to bridging within a hopper housing a substantial volume of the substance in a substantially amorphous mass.

Another object is to provide such an apparatus which ensures that substances having the propensity to bridge within a hopper as a result of adherence in a caked consistency and/or the absorption of moisture from the environment, can be dispensed with a reliability and in accordance with predetermined perimeters not heretofore achieved in the art.

Another object is to provide such an apparatus which, still further, has particular utility in the liquification of such substances as gypsum, natural and chemical fertilizers, soil additives and amendments, and a multiplicity of materials which must be liquified over time from an amorphous mass of the material.

Another object is to provide such an apparatus which is particularly well suited to use in the liquification and application of gypsum to large agricultural acreages over several days of irrigation and with little or no attention by supervisory personnel.

Further objects and advantages are to provide improved elements and arrangements thereof in an apparatus for the purpose described which is dependable, economical, durable and fully effective in accomplishing its intended purpose.

These and other objects and advantages of the present invention are achieved, in the preferred embodiment of the apparatus of the present invention, in an apparatus for liquifying a substance including a housing for feeding the substance to a delivery position; a container for supplying liquid in a liquifying station; and an assembly operable to engage the substance in the delivery position and transport the substance toward the liquifying station for receipt in the liquid.

DESCRIPTION OF THE PREFERRED EMBODIMENT

Figure 1:
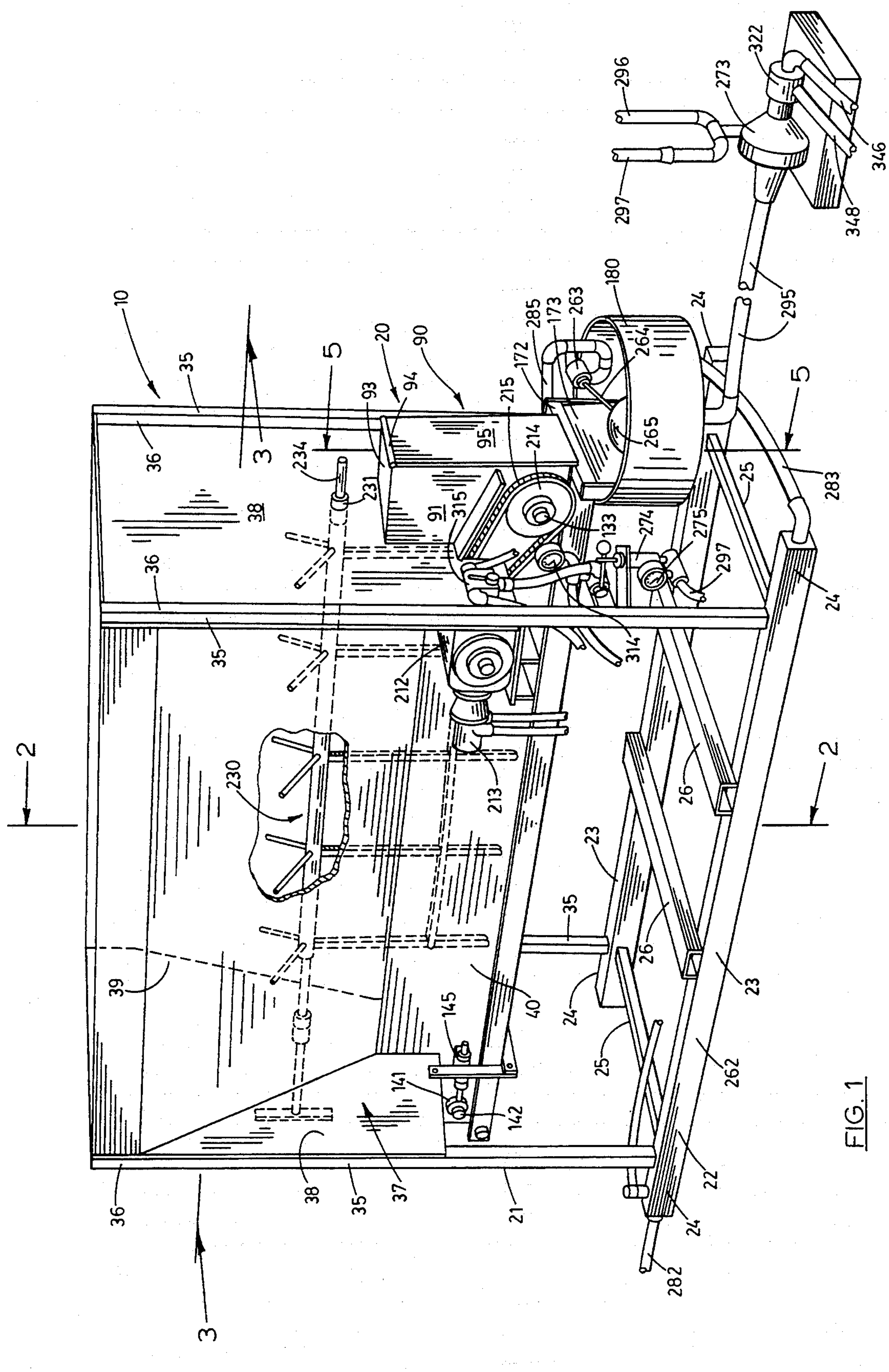
FIG. 1 is a fragmentary perspective view of the apparatus for liquifying substances of the present invention.
Figure 4:
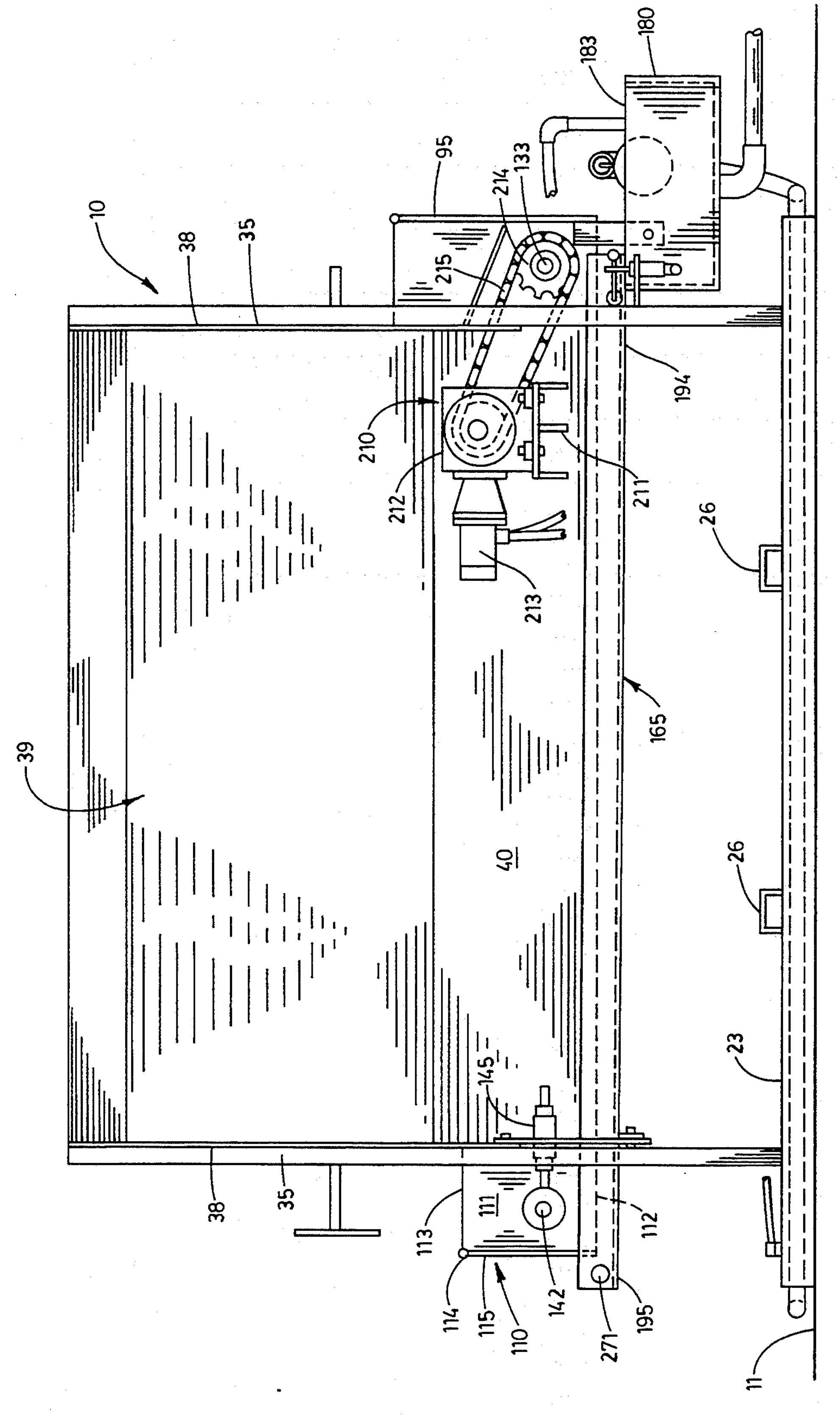
FIG. 4 is a side elevation of the apparatus of the present invention.

Referring more particularly to the drawings, the apparatus for liquifying substances of the present invention is generally indicated by the numeral 10 in FIG. 1. While the apparatus can be constructed in a variety of specific embodiments, the embodiment shown in the drawings and described herein is uniquely well suited to the liquification of such substances as gypsum, natural and chemical fertilizers, and other soil additives and amendments. This is particularly true where the substance is of a powdered form and is to be delivered through an irrigation system over a prolonged period of time and with little or no supervision. As shown in FIG. 4, the apparatus is rested on the earth's surface 11.

The apparatus 10 has a main processing unit generally indicated by the numeral 20 which has a rigid metal frame 21 including a skid 22. The skid includes a pair of spaced, parallel tubular beams 23, each having opposite end portions 24. The opposite end portions of the tubular beams are interconnected by cross beams 25 adjacent the opposite end portions thereof, as best shown in FIG. 1. A pair of channel members 26 are mounted on and interconnect the tubular beams 23 in spaced substantially parallel relation.

The frame 21 has four upright frame members 35 individually mounted on the tubular beams 23 adjacent to the opposite end portions 24 thereof and disposed in right angular relation thereto so that the upright frame members are disposed in spaced, substantially parallel relation to each other. The upright frame members have upper end portions 36. A main housing 37 is mounted on and supported by the upright frame members. The main housing includes a pair of end plates 38 individually mounted on and extending between the upright frame members on the right as viewed in FIG. 4 and on the upright frame members on the left as viewed in FIG. 4. Thus, the end plates are disposed in parallel relation to each other extending transversely of the frame 21. With the end plates, the main housing has a hopper generally indicated at 39 extending downwardly into a trough generally indicated at 40. The front end plate on the fight as viewed in FIG. 4 has a lower edge 41. The rear end plate on the left as viewed in FIG. 4 has a lower edge 42. The hopper and trough have an interior compartment 43.

Figure 2:
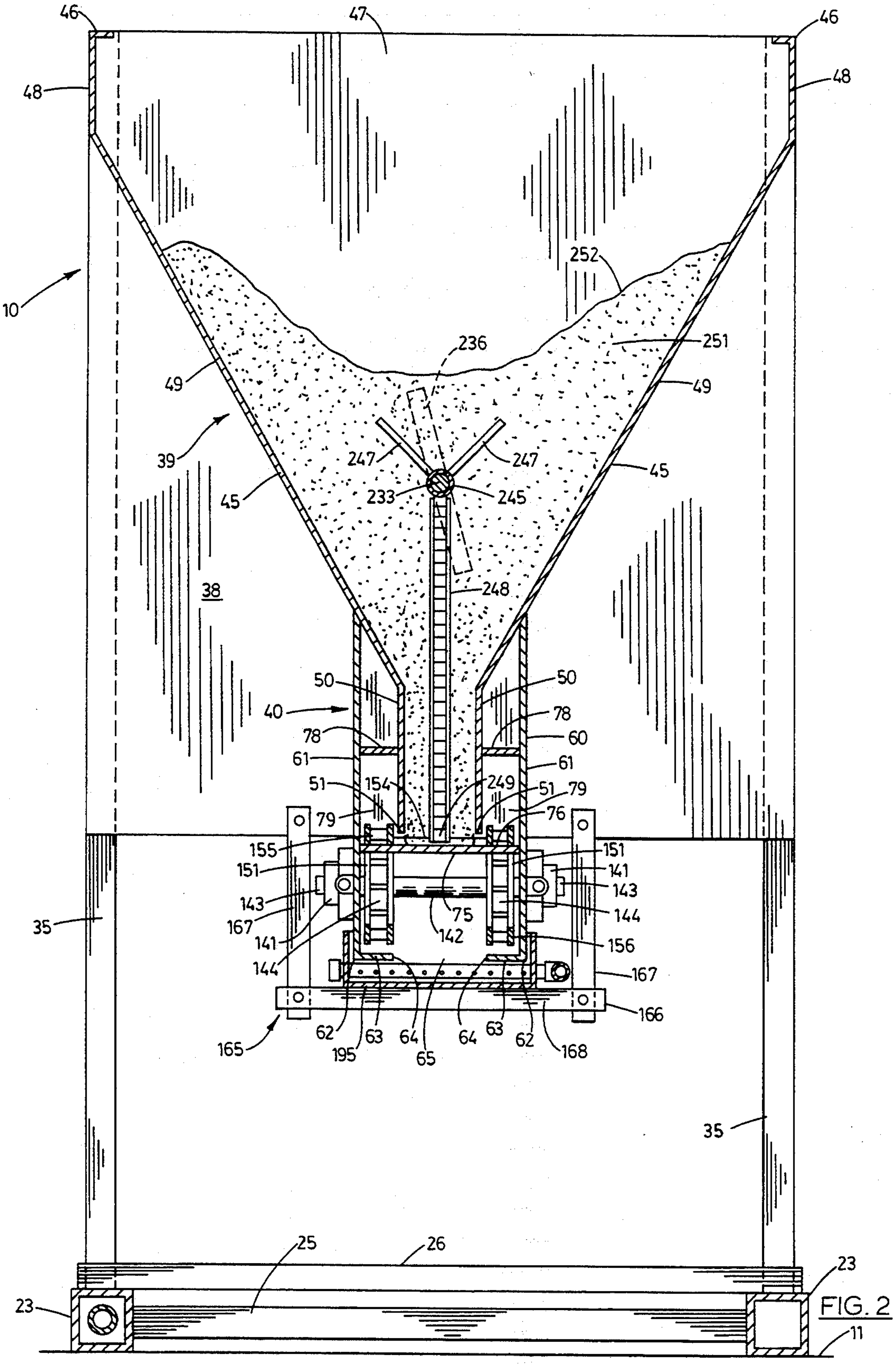
FIG. 2 is a somewhat enlarged transverse, vertical section taken from a position indicated by line 2—2 in FIG. 1.

The main housing 37 has a pair of side walls 45 which define the hopper 39 and trough 40. The configuration of the side walls can best be seen in cross section in FIG. 2 and have upper end portions 46 spaced from each other to define a mouth 47 for the hopper. The mouth can be covered by a closure, not shown, if desired. The side walls have vertical portions 48 leading downwardly into converging portions 49 to lower vertical portions 50. The lower vertical portions have lower edges 51 which are laterally spaced from each other as shown in FIG. 2, and which define a horizontal plane which is just slightly above the lower edge 42 of the rear end plate 38. Thus, as can be seen in FIG. 2, the upper end portions, vertical portions and converging portions of the side walls, with the end plates 38, define the hopper 39 of the main housing. The lower vertical portions 50 extending to the lower edges 51 define a portion of the trough 40 of the main housing.

The trough 40 of the main housing 37 also includes an outer housing 60. The outer housing has side walls 61 extending from the lower portions of the respective converging portions 49 of the side walls 45 extending downwardly in spaced, parallel relation to the lower vertical portions 50 of the side walls. The side walls 61 have lower end portions 62 which extend downwardly below the lower edges 51 of the lower vertical portions 50 of the side walls 45, as best shown in FIG. 2. The side walls 61 have bottom plates 63 extending short distances toward each other so as to define a horizontal plane and have parallel interior edges 64 defining a passage 65 therebetween. The side walls 61 have opposite end portions 66 extending outwardly beyond the end plates 38, as best shown in FIG. 3.

A platform, or support plate, 75 is mounted on and extends between the side walls 61, as shown in FIG. 2.

The support plate has a flat upper surface 76 defining a horizontal plane parallel to the horizontal plane defined by the lower edges 51 of the lower vertical portions 50 of the trough 40 and in closely spaced relation thereto. As shown in FIG. 3, the support plate extends in opposite directions longitudinally of the main housing 37 beyond the end plates 38 of the main housing and to downwardly sloping end plates 77. Brace plates 78 interconnect the side walls 61 of the outer housing 60 with the lower vertical portions 50 of the side walls 45. As can best be seen in FIG. 2, the support plates 75 extend laterally of the lower edges 51 of the side walls 45. Thus, the lower vertical portions 50, the brace plate 78, the side walls 61 and the support plates 75 define, in effect, compartments laterally disposed relative to the interior compartment 43 of the trough and entirely isolated therefrom except for the slots defined by the distances between the respective lower edges 51 and the upper surface 76 of the support plate. These compartments are hereinafter referred to as upper chain run compartments 79.

Figure 3:
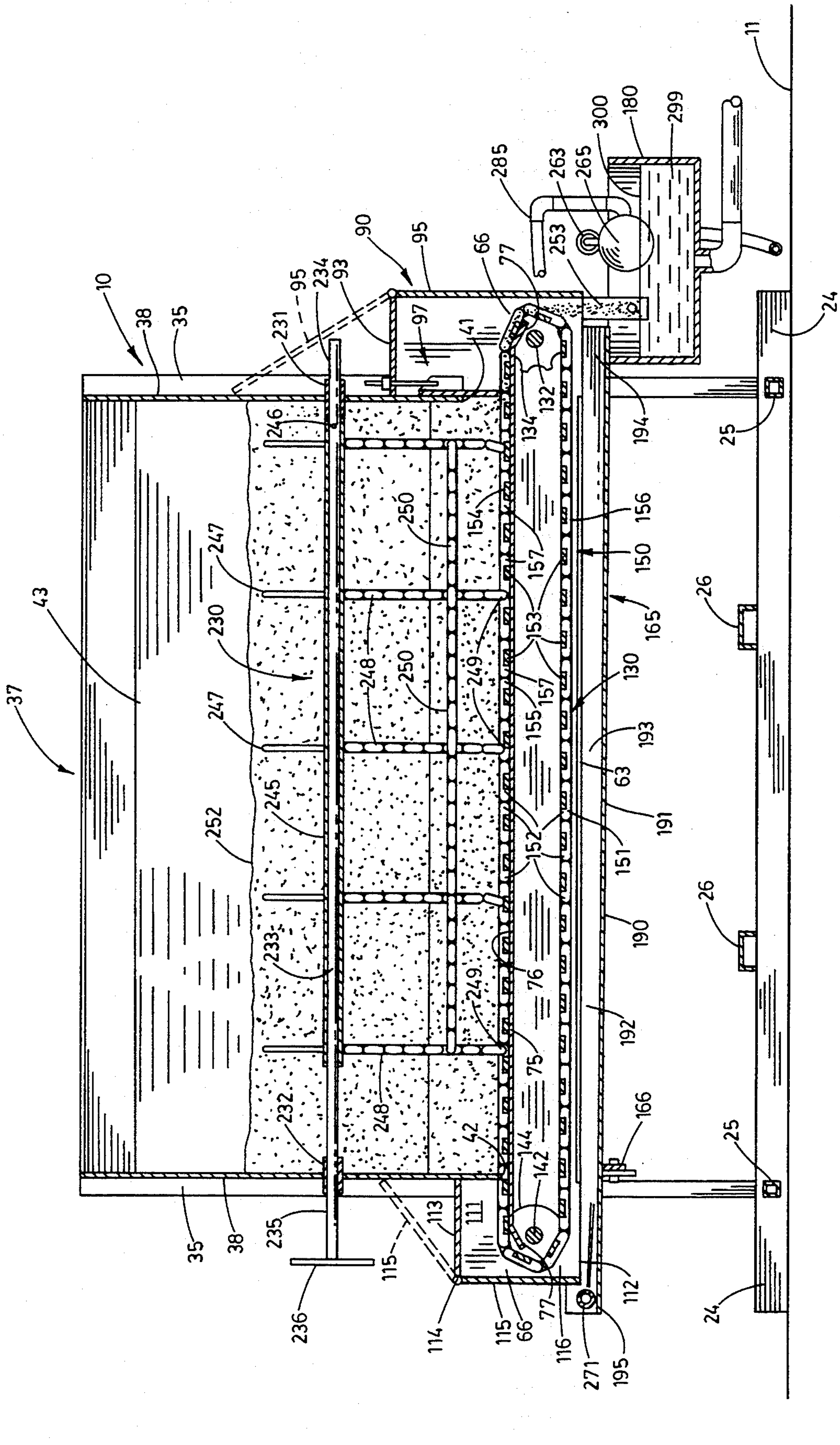
FIG. 3 is a longitudinal vertical section taken on line 3—3 in FIG. 1.

The main housing 37 has a front housing 90 mounted on the front end plate 38 on the right as viewed in FIGS. 1, 3 and 4. The front housing has parallel side walls 91 extending downwardly to lower edges 92 which are coextensive with the lower edges of the side walls 61 of the outer housing 60. The front housing has a top wall 93 interconnecting the side walls 91 which, in turn, mounts a hinge assembly 94. A door 95 is mounted on the hinge assembly 94 for pivotal movement between the lowered position shown in full lines in FIG. 3 and a raised position shown in phantom lines in FIG. 3. The front housing has an interior 96.

Figure 5:
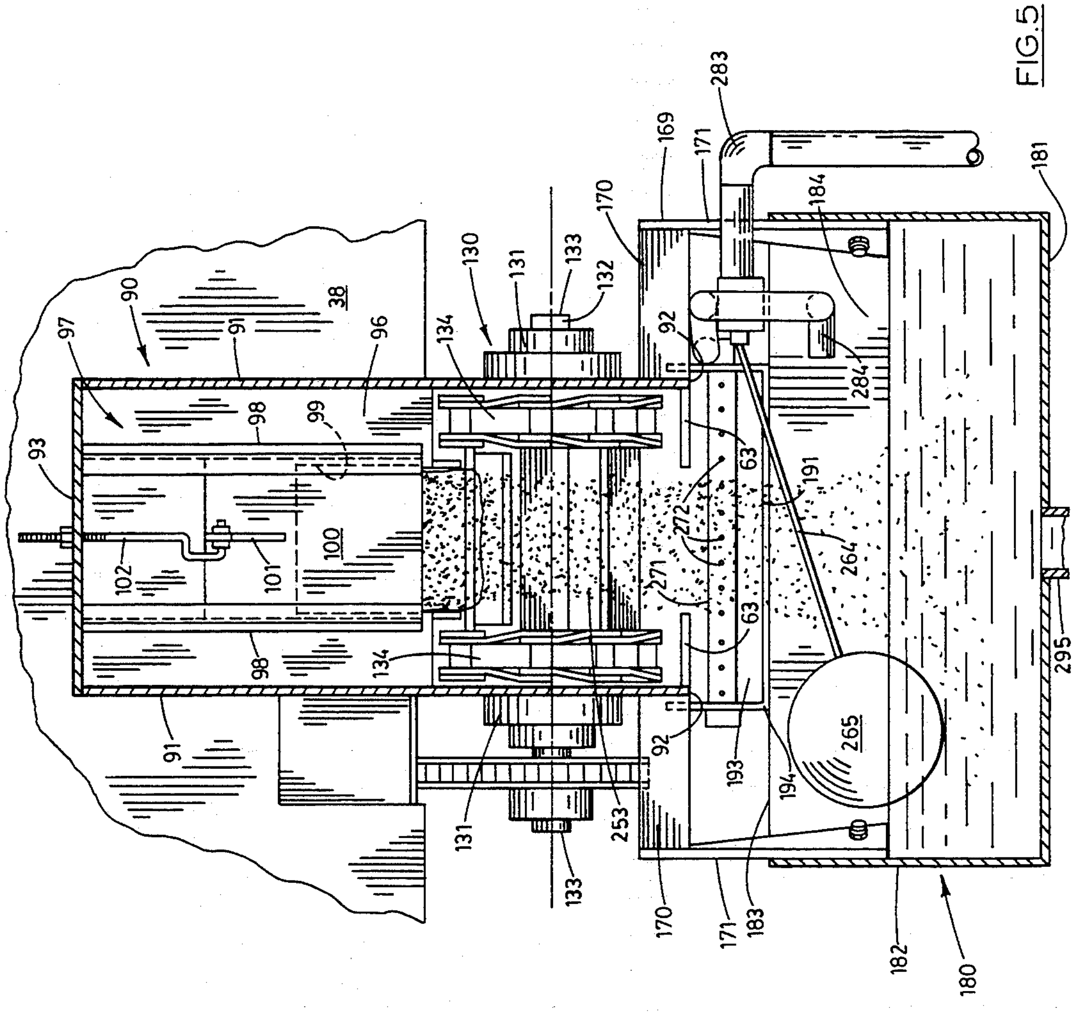
FIG. 5 is a somewhat enlarged fragmentary vertical section taken from a position indicated by line 5—5 in FIG. 1.

As shown best in FIG. 5, an interior door assembly 97 is provided on the surface of the end plate 38 on which the front housing is mounted. The interior door assembly includes a pair of parallel, vertical tracks 98 laterally disposed relative to an opening 99 formed in the end plate 38. An interior door 100 is mounted in the tracks so as to extend across the opening 99 and to be slidably movable within the tracks. A flange 101 is mounted on the interior door. The flange is connected to the top wall 93 by a bolt and nut assembly 102, as shown in FIG. 5, so as to suspend the interior door at a selected position in the tracks. Thus, by adjustment of the nut and bolt assembly, the position of the interior door 100 in the tracks and thereby the effective size of the opening 99 is controlled by the bolt and nut assembly 102.

As shown in FIGS. 3 and 4, the main housing 37 includes a rear housing 101 on the left as shown in those views. The rear housing has vertical side walls 111 mounted on the end plate 38 on the left as viewed in FIGS. 3 and 4 and extend outwardly therefrom in parallel relation and in individual alignment with the side walls 61 of the outer housing 60. The side walls 111 have lower edges 112 which are individually coextensive with the lower edges of the side walls 61. A top wall 113 is mounted on and extends between the side walls 111 and mounts a hinge assembly 114 in spaced, parallel relation to its respective end plate 38. A door 115 is mounted on the hinge assembly 114 for movement between a closed position shown in FIG. 3 in full lines and a raised position shown in phantom lines in FIG. 3. The rear housing has an interior 116.

A conveyor assembly 130 is mounted within the main housing 37 extending from the interior 116 of the rear housing, through the trough 40 between the side walls 61 and into the interior 96 of the front housing. The conveyor assembly has a pair of front bearing assemblies 13 1 individually mounted on the side walls 91 of the front housing 90. A drive shaft 132 is rotationally received in the front bearing assemblies extending therebetween through the interior 96 of the front housing. The drive shaft has opposite end portions 133. Sprockets 134 are individually mounted on the drive shaft in predetermined positions between the side walls 91 and within the interior 96 of the front housing.

A pair of rear bearing assemblies 141 are individually mounted on the side walls 111 of the rear housing 110 to define an axis of rotation parallel to the axis of rotation defined by the front bearing assemblies 13 1. A rear shaft 142 is rotationally received in the rear bearing assemblies and has opposite end portions 143 extending outwardly of the rear housing. The rear shaft thus extends through the interior 116 of the rear housing. Chain supports, or sprockets, 144 are individually mounted on the rear shaft in predetermined positions aligned longitudinally of the main housing with their corresponding respective sprockets 134. Conventional conveyor adjusting assemblies 145 are individually mounted on the walls 61 of the outer housing 60 and are individually connected to their respective adjacent rear bearing assemblies 141. The conveyor adjusting assemblies are operated in the normal fashion to move the rear bearing assemblies relatively farther from or near to the front bearing assemblies so as to be able to adjust tension on the conveyor assembly 130.

A chain conveyor 150 is entrained about the sprockets 134 and chain supports 144, as best shown in FIG. 3. The chain conveyor consists of a pair of chains 151 which are individually entrained about corresponding sprockets 134 and chain supports 144 so as to extend therebetween and be movable about the drive shaft 132 and rear shaft 142. Each chain is composed of a plurality of interconnected links 152. Corresponding links of the chain aligned transversely of the conveyor assembly are interconnected by flat flight bars 153 of a thickness slightly less than the distance between the upper surface 76 of the support plate 75 and the lower edges of the side walls 45. The flight bars thus have flat upper surfaces 154 which pass immediately beneath the lower edges 51, as shown in FIG. 2. The chain conveyor 150 has an upper run which extends across the upper surface 76 of the support plate 75 and over the sloping end plates 77 thereof. The chain conveyor has a lower run 156 which passes beneath the drive shaft 132 and rear shaft 142 and thus beneath the support plate 75. The flight bars 153 are spaced from each other to define interstices 157 therebetween. Thus, each interstice is defined by the adjacent flight bars and by the upper surface 76 of the support plate 75.

Referring more particularly to FIG. 2, it will be seen that each chain 151 of the chain conveyor 150 extends through and along one of the upper chain run compartments 79 and is thus isolated from the interior compartment 43 of the trough 40.

A drain trough assembly 165 is mounted on the underside of the main housing 37. The drain trough assembly includes a rear support frame 166 mounted on and suspended from the end plate 38 and shown best in FIG. 2. The rear support frame includes a pair of parallel arms 167 mounted on the end plate and interconnected by cross member 168. A front support frame 169 is mounted on the side walls 61 of the outer housing 60, as best shown in FIG. 5. The front support frame includes laterally extending horizontal members 170 mounted on the side walls 61 and downwardly extending arms 171. A mounting plate 172 is mounted on and extends between the arms 171 and, in turn, mounts a resilient flap 173 shown best in FIG. 1.

A dissolving tank or reservoir 180 is mounted on arms 171, as shown in FIG. 5. The reservoir has a bottom wall 181 and a cylindrical side wall 182 and is water tight. The cylindrical side wall has an angular upper edge 183 and, with the bottom wall, defines an interior 184 for the reservoir.

A drain trough 190 has a flat bottom wall 191 and upstanding side walls 192. The bottom wall and side walls form a water tight interior 193 for the drain trough. The drain trough has a forward portion 194 and an opposite rearward portion 195. The drain trough is mounted, by any suitable means on the cross member 168 of the rear support frame 166 and on the annular upper edge 183 of the cylindrical side wall 182 of the reservoir 180. The drain trough is so mounted that it slopes gradually from the rearward portion 195 downwardly toward the forward portion 194. The forward portion 194 of the drain trough is suspended over the interior 184 of the reservoir 180, as shown in FIG. 3.

Referring more particularly to FIGS. 1, 4 and 5, a conveyor drive assembly 210 is mounted on the main processing unit 20. The conveyor drive assembly includes a mounting platform 211 mounted on the side walls 61 of the outer housing 60. A gear box 212, of any suitable type, is mounted on the mounting platform and has an hydraulic motor 2 13 mounted thereon in driving relation to the gear box. A sprocket 214 is mounted on the opposite end portion 133 on the left, as viewed in FIG. 5. A drive chain 215 is entrained about the sprocket 214 and is connected in driven relation to the gear box 212. As will be appreciated, the hydraulic motor 213 drives the gear box 212 to drive the drive shaft 132 of the conveyor assembly 130 through the intermediary of the drive chain 215 extending between the gear box and the sprocket 214.

As perhaps best shown in FIG. 3, the apparatus 10 has a material releasing assembly 230 mounted on and extending through the hopper 39. The material releasing assembly includes a front sleeve 23 1 mounted on and extending through the end plate 38 on the right, as viewed in FIG. 3, and a rear sleeve 232 mounted on and extending through the end plate 38 on the left, as viewed in FIG. 3. The front and rear sleeves are aligned to define an axis of rotation spaced from and parallel to the upper run 155 of the chain conveyor 150. A shaft 233 is received for rotational movement in the front and rear sleeves and has a forward end portion 234 extending outwardly of the hopper through the front sleeve. The shaft has an opposite, rearward end portion 235 extending outwardly of the hopper through the rear sleeve 232. A handle 236 is mounted on the rearward end portion of the shaft so that the shaft may selectively be pivoted or rotated about its longitudinal axis from externally of the hopper.

A mounting sleeve 245 is slidably received on the shaft 233 and fixed in position relative thereto by a mounting pin 246 extending through the mounting sleeve and into the shaft. The mounting sleeve is so mounted on the shaft in the position shown in FIG. 3 adjacent to or abutting the front sleeve 23 1. A plurality of rods 247 are mounted, as by welding, on the mounting sleeve extending outwardly at fight angles to the mounting sleeve and shaft and preferably disposed in pairs wherein the rods of each pair are disposed at about 90 degrees relative to each other, as best shown in FIG. 1. A plurality of vertical chains 248 are suspended from the mounting sleeve 245 in spaced relation to each other and are of corresponding lengths reaching lower end portions 249 which, as shown in FIG. 2, extend through the trough 40 and are engageable by the flight bars 153 of the conveyor assembly 30. The vertical chains are interconnected by linking chains 250 interconnecting adjacent vertical chains and extending substantially parallel to the upper run 155 of the chain conveyor preferably within the trough 40. As shown in FIGS. 2 and 3, the interior compartment 43 of the hopper 39 and trough 40 is filled with material to be liquified 251 embodied in a substantially amorphous mass. The material has an upper surface 252. For illustrative convenience, the material released from the conveyor assembly 130, as will hereinafter be described, is indicated generally by the numeral 253.

As previously noted, the apparatus 10 of the present invention has particular utility in the liquification of such substances as gypsum, natural and chemical fertilizers and the like. For purposes of illustrative convenience, it will be considered that the material 251 in the illustrative embodiment is gypsum. Gypsum has a powdered form which, in bulk adheres to itself and other surfaces so as to form a caked consistency having a considerable tendency to bridge. Among the other physical properties of gypsum is its ability to dissolve readily in water.

Figure 7:
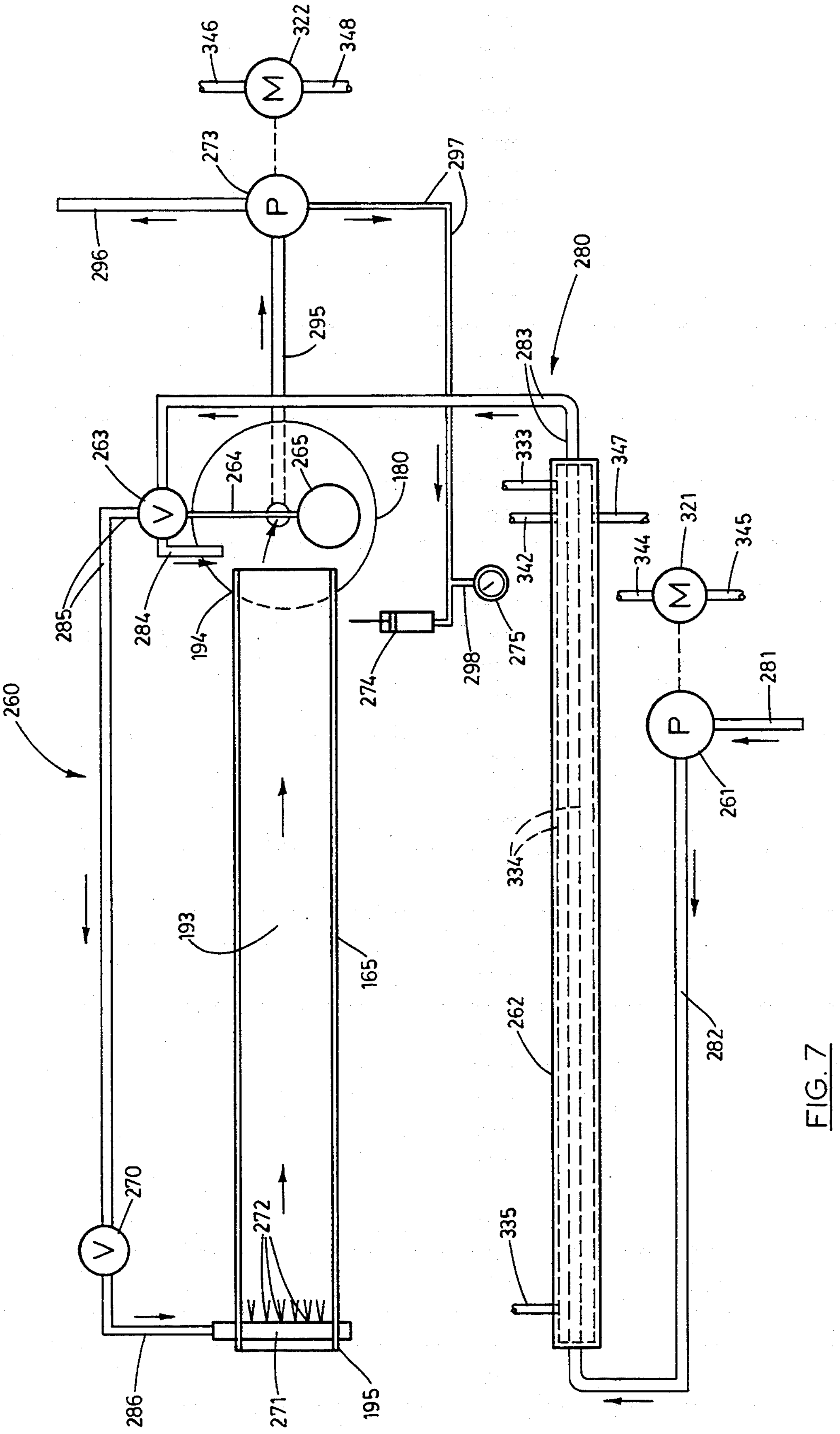
FIG. 7 is a schematic diagram of the liquid, or water system, of the apparatus of the present invention.

The apparatus 10 includes a water system 260 shown diagrammatically in FIG. 7. The water system includes a water pump 261 and a heat exchanger 262. The heat exchanger is embodied within the tubular beam 23 on the left, as viewed in FIG. 2. The internal structure of the heat exchanger will hereinafter be described. The water system further includes a water level control valve 263 which is mounted by any suitable means on the reservoir 180. The water level control valve has an arm 264 extending therefrom on which a float 265 is mounted at the distal end thereof.

The water system 260 further includes a control vane 270. A release manifold 271 is mounted on and extends through the side walls 192 of the drain trough 190 at the rearward portion 195 thereof. The release manifold has a plurality of orifices 272 extending therethrough in spaced relation to each other and facing into the interior 193 of the drain trough in the direction of the forward portion 194 of the drain trough. The water system 260 further includes a discharge pump 273 mounted at any suitable location such as on a concrete pad rested on the earth's surface 11, as shown in FIG. 1. A safety valve 274 and a pressure gauge 275 are mounted on the main processing unit 20 at any suitable location such as is also shown in FIG. 1.

The water system 260 still further includes a water circuit 280 including a water conduit 281 extending from a source of water under pressure, not shown, and operably connected to the water pump 261 in fluid supplying relation. A water conduit 282 extends from the water pump 261 in fluid receiving relation through the heat exchanger 262, centrally thereof, to the forward end portion of the heat exchanger embodied in the tubular beam 23 on the left, as viewed in FIG. 2. A water conduit 283 is connected to water conduit 282 and extends in fluid transferring relation to the water level control valve 263 in fluid supplying relation thereto. A water conduit 284 extends from the water level control valve to a position disposed in fluid supplying relation to the interior 184 of the reservoir 180, as best shown in FIG. 5. A water conduit 285 extends from the water level control valve 263 to the control valve 270 in fluid supplying relation. A water conduit 286 extends from the control valve 270 to the release manifold 271 in fluid supplying relation.

A water conduit 295 is connected in fluid receiving relation to the bottom wall 181 of the reservoir 180 and to the interior 184 thereof and extends in fluid supplying relation to the discharge pump 273. A water conduit 296 is connected in fluid receiving relation to the discharge pump 273 and extends to any desired location for purposes of supplying the solution produced by, in the illustrative embodiment, dissolving of the gypsum in water. Typically, in the case of agricultural usages, the water conduit 296 extends to the existing irrigation system for the acreage to be irrigated and can be released either through a physical connection therewith or by releasing it into, for example, a standpipe of the irrigation system. Such a standpipe thus acts as a connection with the remainder of the irrigation system thereby supplying the solution of gypsum and water for dispersal to the acreage involved through the irrigation system with, and over the same period of time, as such irrigation takes place.

A water conduit 297 extends from the discharge pump 273 to the safety valve 274. A water conduit 298 extends from water conduit 297 to the pressure gauge 275. The pressure gauge is operable to register water pressure in the water circuit 280. The safety valve 274 is operable to terminate operation of the apparatus 10, and specifically the conveyor assembly 130 in the event water pressure drops beyond a predetermined level. This operates to ensure that the apparatus will not simply continue to feed material to be liquified when there is not water in which to dissolve the gypsum, as will hereinafter be described in greater detail. For illustrative convenience, water is indicated at 299 in the interior 184 of the reservoir 180. The upper surface of the water is indicated at 30.

Figure 6:
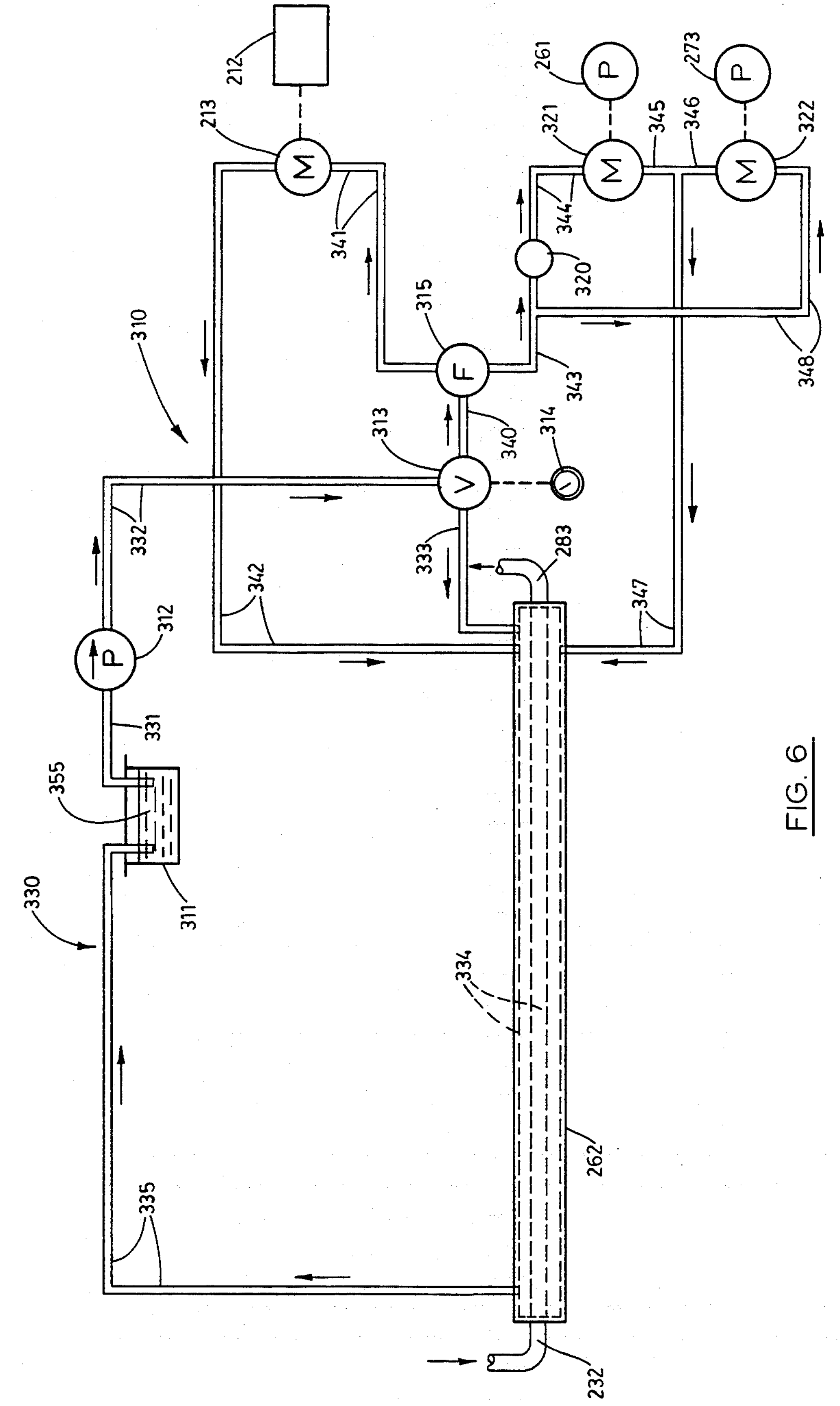
FIG. 6 is a schematic diagram of the hydraulic system of the apparatus of the present invention.

The apparatus 10 further includes an hydraulic system generally indicated by the numeral 310 in FIG. 6 wherein the hydraulic system is shown in the schematic diagram thereof. The hydraulic system includes a hydraulic reservoir 311 and an hydraulic pump 312. The hydraulic system further includes a three-way valve 313, a pressure gauge 314 and a flow control 315. The three-way valve, pressure gauge 314 and flow control 315 can be mounted at any suitable location such as on the end plate 38 at the position indicated in FIG. 1. The pressure gauge 315 is operably connected to the three-way valve to register hydraulic fluid pressure within the hydraulic system. The flow control 315 is selectively operable to control the flow of hydraulic fluid therethrough.

The hydraulic system 310 has an oil restrictor 320, an hydraulic motor 321 and an hydraulic motor 322. The hydraulic motor 321 is connected in driving relation to the water pump 261 and the hydraulic motor 322 is connected in driving relation to the discharge pump 273.

The hydraulic system 310 further includes an hydraulic circuit 330 shown in FIG. 6. The hydraulic circuit includes an hydraulic conduit 331 interconnecting the hydraulic reservoir 311 and the hydraulic pump 312. An hydraulic conduit 332 interconnects the hydraulic pump 312 and the three-way valve 313 in hydraulic fluid supplying relation. An hydraulic conduit 333 interconnects the three-way valve 313 and the interior of the heat exchanger 262. Hydraulic conduit 334 is connected to the hydraulic conduit 333 and extends the length of the heat exchanger in heat transversing relation to the water conduit 282. An hydraulic conduit 335 interconnects the hydraulic conduit 334 and the reservoir 311 in hydraulic fluid supplying relation to complete one portion of the hydraulic circuit.

The hydraulic circuit 330 further includes an hydraulic conduit 340 interconnecting the three-way valve 313 and the flow control 315 in hydraulic fluid supplying relation. An hydraulic conduit 341 interconnects the flow control and the hydraulic motor 213. An hydraulic conduit 342 interconnects the hydraulic motor 213 and the hydraulic conduit 334 within the heat exchanger in hydraulic fluid supplying relation. An hydraulic conduit 343 interconnects the flow control 3 15 and the oil restrictor 320. An hydraulic conduit 344 interconnects the oil restrictor and the hydraulic motor 321 in hydraulic fluid supplying relation. Hydraulic conduits 345 and 346 individually extend from the hydraulic motors 321 and 322, respectively, and are connected in hydraulic fluid supplying relation to an hydraulic conduit 347. Hydraulic conduit 347 is connected in hydraulic fluid supplying relation to the hydraulic conduit 334 of the heat exchanger 262. Hydraulic conduit 348 interconnects hydraulic conduit 343 and hydraulic motor 322 in hydraulic fluid supplying relation to complete this portion of the hydraulic circuit 330. For illustrative convenience, hydraulic oil 355 is shown in the reservoir 311.

The various pumps of the water system 260 and hydraulic system 310 are powered by any suitable power source, not shown.

OPERATION

The operation of the described embodiment of the subject invention is believed to be clearly apparent and is briefly summarized at this point.

Gypsum in bulk form is deposited within the hopper 39 in a volume corresponding to the quantity of gypsum required for application to the acreage involved through normal irrigation. The volume required is controlled, not only by the acreage involved and the period of time during which irrigation will take place, but also the speed of operation of the apparatus 10. This speed of operation is controlled, not only by the speed of operation of the discharge pump 273 as controlled by the hydraulic motor 322, but also by the rate of speed of the conveyor assembly 130. The rate of speed of the conveyor assembly is controlled by the speed of operation of the hydraulic motor 213 which drives the chain conveyor 150 through the intermediaries of the gear box 212 and drive chain 215. The speed of operation of the hydraulic motors 322 and 213 is controlled by the flow control 315. Accordingly, the initiation of operation of the apparatus 10 includes setting the flow control 315 at the desired setting for the speed of operation desired. The flow control 315 is, in the illustrative embodiment, located immediately to the left of the drive chain 215 on the front end plate 38. The operator simply positions the control lever of the flow control at the desired setting.

Similarly, the three-way valve 3 13 of the hydraulic system 310 is set in the desired position preferably to supply hydraulic fluid throughout the entire hydraulic system as shown diagrammatically in FIG. 6.

The water pump 261, driven by the hydraulic motor 321, delivers water from the source along water conduits 281,282, 283 and to the valve 263. The control arm 264 and float 265 operate to supply and maintain a predetermined water level within the reservoir 180 through water conduit 284. This water level for normal operation is shown in FIG. 5. The discharge pump 273 draws the water off at a rate controlled by the hydraulic motor 322 and as the water is drawn off, the water level control valve 263 operates to replace the water as necessary to maintain the water level shown in FIG. 3.

Simultaneously, the control valve 263 supplies water along water conduit 285 through control valve 270 to the release manifold 271. The water is discharged in jets through the orifices 272 of the release manifold which washes the interior 193 of the drain trough 190 so as to wash any gypsum which has fallen from the conveyor assembly 130 thereabove into the reservoir 180.

Referring then more particularly to FIGS. 2, 3 and 5, the gypsum within the hopper 39 and trough 40 is continuously gravitationally fed through the interior compartment 43 thereof and into the interstices 157 of the upper run 155 of the chain conveyor 150. The upper run is moved along the upper surface 76 of the support plate 75 in a direction from left to fight as viewed in FIG. 3 and, thus, in the direction of the reservoir 180. As best shown in FIG. 2, the flight bars 153 and the upper surfaces 154 thereof pass beneath the lower edges 51 of the side walls 45 to transport the gypsum received in the interstices along the upper surface of the support plate. During such movement, however, the chains 151 of the chain conveyor 150 are isolated from the gypsum by virtue of being encapsulated within the upper chain run compartments 79. This ensures that the gypsum does not interfere with operation of the chain conveyor or with the engagement of the sprockets 134 and chain supports 144 with the respective chains 15 1 or in any other way interfere with operation of the apparatus.

As previously noted, gypsum has the propensity, to bridge within dispensing devices and, particularly, where gypsum is contained in the substantially amorphous mass typical of large dispensing devices. In the apparatus 10 of the present invention the material releasing assembly 230 operates both automatically and manually as desired to ensure that a constant feeding of the gypsum to the interior compartment 43 within the trough 40 is maintained and that such bridging typical of conventional devices is avoided. This is achieved with the material releasing assembly automatically by virtue of the vertical chains 248 and linking chains 250 best shown in FIGS. 2 and 3. Since the lower end portions 249 are engaged by the flight bars 153 as they move along the upper surface 76 of the support plate 75, such contact causes the vertical chains and linking chains to be jostled sufficiently to disturb the amorphous mass of gypsum so as to cause it gravitationally to continue to move toward the conveyor assembly in the manner desired. This operation is entirely automatic and ensures that the apparatus 10 continues to function normally as desired without any attention whatsoever over long periods of operation without risk that bridging will occur and the adverse consequences resulting therefrom. Manual operation of the material releasing assembly 230 is achieved by grasping the handle 236 to move the shaft 233 and thereby the rods 247, as well as the vertical chains 248, within the mass of gypsum so as sufficiently to disturb the mass to prevent bridging and ensure continual feeding of the gypsum toward the conveyor assembly. Using the handle 236, the shaft can be rotated about the longitudinal axis as well as moving the mounting sleeve 245 and thus the rods and vertical chains from side to side within the mass of gypsum as necessary further to ensure such feeding. If desired, the mounting sleeve 245 can be drawn into engagement with either the front sleeve 231, as shown in FIG. 3, or the rear sleeve 232 with a degree of impact so as further to loosen the gypsum within the hopper and trough.

The gypsum contained within the interstices 157 passes beneath the interior door 100 and is released downwardly into the water 299 within the reservoir 180. The flap 173 operates to confine the gypsum to a downward course into the water. Gypsum is highly water soluble and so the gypsum gravitationally fed into the water promptly dissolves to form a solution composed, of course, of water and gypsum. This solution is drawn off through conduit 295 by the discharge pump 273 and delivered to the place for release through conduit 296. As previously noted, the point of release for the gypsum water solution is the normal irrigation system for the acreage involved. The gypsum water solution may simply be discharged into a standpipe constituting part of the irrigation system for distribution to the acreage therethrough.

Therefore, the apparatus for liquifying substances of the present invention has particular utility in the liquification of such substances as must, for other reasons, be dispensed from a large amorphous mass of the substance over a relatively long period of time; has particular utility in the dispensing of such substances as gypsum and other materials which are embodied in powdered form and wherein the substances may be susceptible to bridging as a result of the absorption of moisture and/or the propensity to adhere in such a fashion as to assume a caked consistency; automatically operates to ensure that such bridging does not take place entirely without being monitored; affords the ability for supervisory personnel additionally to ensure that such bridging does not take place; operates automatically to recover material which has inadvertently been released to the environment and to direct the material for usage in the manner desired; can be operationally adjusted to achieve a volume of distribution over time which is entirely reliable; and is otherwise is entirely effective in achieving its operational objectives.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An apparatus for liquifying a substance comprising a receptacle containing a quantity of said substance above a delivery position defined by side walls extending to lower edges bounding said delivery position for gravitationally feeding said substance to the delivery position; a liquifying station: means for supplying liquid to the liquifying station; and a conveyor operatively associated with the liquifying station and operable to engage the substance in the delivery position and to transport the substance toward the liquifying station, said conveyor having conveyor chains individually outwardly disposed relative to said lower edges of said side walls interconnected by flight bars passing through said delivery position and in juxtaposition to said lower edges whereby said conveyor chains are substantially separated from the substance in the delivery position by the lower edges of the side walls for gravitational receipt of the substance in the delivery position and between adjacent flight bars substantially separated from said conveyor chains for transport of the substance toward the liquifying station by said flight bars.

2. The apparatus of claim 4 further comprising a platform having a portion of said conveyor passing thereover and against said quantity in the delivery position to transport said substance in a substantially continuous stream over the platform toward the liquifying station.

3. The apparatus of claim 1 wherein said substance is in a substantially powdered form in said receptacle which assumes a caked consistency in the delivery position under the gravitational pressure of the substance thereabove and said conveyor includes a plate disposed in facing engagement with said caked substance in the delivery position and a portion of the conveyor, having a plurality of interstices therein, moveable over said plate so as to receive said caked substance in the interstices and transport the caked substance over the plate toward the liquifying station.

4. The apparatus of claim 3 wherein said interstices are defined by a plurality of said flight bars, having substantially flat configurations and spaced from one another to define said interstices.

5. The apparatus of claim 1 including a receiving member disposed beneath the conveyor in substantially vertical alignment with the delivery position for the gravitational receipt of said substance falling from the conveyor.

6. The apparatus of claim 4 wherein said substance is gypsum, said liquid is water and including means connected to the liquifying station for transporting gypsum liquified in water therefrom.

7. The apparatus of claim 4 including a releasing assembly extending through said receptacle and the quantity of said substance therewithin, said releasing assembly being operable to disturb said substance within the receptacle to maintain said gravitational feeding of the substance to the delivery position.

8. The apparatus of claim 7 wherein said releasing assembly includes a shaft extending through said receptacle and the quantity of the substance therewithin, mounting members moveable with the shaft and means supported by the shaft externally of the receptacle for moving said shaft to disturb said substance.

9. The apparatus of claim 7 wherein said releasing assembly includes a plurality of flexible members extending through the quantity of said substance in the receptacle to the delivery position and engageable by the flight bars to move said flexible members and thereby disturb said substance.

10. An apparatus for liquifying a substance comprising means for feeding said substance to a delivery position including a receptacle containing a quantity of said substance above said delivery position for gravitationally feeding said substance to the delivery position; a liquifying station: means for supplying liquid to the liquifying station; an assembly operatively associated with the liquifying station and operable to engage said substance in the delivery position and transport the substance toward said liquifying station for receipt in said liquid and wherein said assembly is a conveyor operable to engage the substance in the delivery position and to transport the substance toward the liquifying station; a trough disposed beneath the conveyor in substantially vertical alignment with the delivery position for the gravitational receipt of said substance falling from the conveyor and extending toward the liquifying station; and means remote from the liquifying station for releasing liquid into the trough to carry the substance falling therewithin toward the liquifying station.

11. An apparatus for liquifying a substance comprising a receptacle for containing a quantity of said substance for gravitational delivery to a delivery position; a liquifying station: means for supplying liquid to the, liquifying station; a conveyor operably associated with the liquifying station and operable to engage the substance in the delivery position and to transport the substance toward the liquifying station for receipt in said liquid; a receiving member disposed beneath the conveyor for the gravitational receipt of said substance falling from the conveyor; and means remote from the liquifying station for releasing liquid along the receiving member to carry the substance falling therewithin toward the liquifying station.

* * * * *

UNITED STATES PATENT AND TRADEMARK OFFICE
CERTIFICATE OF CORRECTION

PATENT NO. : 5,439,653

DATED : August 8, 1995

INVENTOR(S) : ABEL A. AVILA, SR.

It is certified that error appears in the above-identified patent and that said Letters Patent is hereby corrected as shown below:

Column 4, line 30, delete "fight" and substitute ---right---.

Column 6, line 2, delete "13 1" and substitute ---131---.

Column 6, line 13, delete "13 1" and substitute ---131---.

Column 7, line 30, delete "2 13" and substitute ---213---.

Column 7, line 43, delete "23 1" and substitute ---231---.

Column 7, line 64, delete "23 1" and substitute ---231---.

Column 7, line 66, delete "fight" and substitute ---right---.

Column 8, line 41, delete "vane" and substitute ---valve---.

Column 10, line 17, delete "3 15" and substitute ---315---.

Column 10, line 62, delete "3 13" and substitute ---313---.

Column 11, line 22, delete "fight" and substitute ---right---.

UNITED STATES PATENT AND TRADEMARK OFFICE

CERTIFICATE OF CORRECTION

PATENT NO. : 5,439,653

DATED : August 8, 1995

INVENTOR(S) : ABEL A. AVILA, SR.

It is certified that error appears in the above-indentified patent and that said Letters Patent is hereby corrected as shown below:

Column 11, line 34, delete "15 1" and substitute ---151---.

Signed and Sealed this

Twenty-first Day of November, 1995

Attest:

BRUCE LEHMAN

*Attesting Officer* *Commissioner of Patents and Trademarks*